United States Patent [19]

Takeshita

[11] Patent Number: 4,624,977

[45] Date of Patent: Nov. 25, 1986

[54] RUBBER COMPOSITION FOR USE IN A TIRE TREAD

[75] Inventor: Michitaka Takeshita, Tokyo, Japan

[73] Assignee: Bridgestone Corporation, Tokyo, Japan

[21] Appl. No.: 737,004

[22] Filed: May 23, 1985

[30] Foreign Application Priority Data

May 23, 1984 [JP] Japan ................................ 59-102666

[51] Int. Cl.$^4$ ............................................... C08K 5/34
[52] U.S. Cl. ..................... 524/87; 524/525; 524/526; 524/571
[58] Field of Search ................... 524/87, 525, 526, 571

[56] References Cited

U.S. PATENT DOCUMENTS

| | | | |
|---|---|---|---|
| 2,794,020 | 5/1957 | Harris et al. | 524/87 |
| 2,998,468 | 8/1961 | Wilde | 524/87 |
| 3,083,180 | 3/1963 | Alt et al. | 524/87 |
| 3,083,181 | 3/1963 | Harris | 524/87 |
| 3,254,072 | 5/1966 | Stright | 524/87 |
| 3,296,189 | 1/1967 | Eastman | 524/87 |
| 3,337,493 | 8/1967 | New et al. | 524/87 |
| 3,842,034 | 10/1974 | Fujimori et al. | 524/87 |
| 4,073,770 | 2/1978 | Son et al. | 524/87 |
| 4,158,000 | 6/1979 | Nagasaki et al. | 524/87 |
| 4,244,864 | 1/1981 | Campbell et al. | 524/87 |

*Primary Examiner*—Joseph L. Schofer
*Assistant Examiner*—Bernard Lipman
*Attorney, Agent, or Firm*—Sughrue, Mion, Zinn, Macpeak and Seas

[57] ABSTRACT

A rubber composition for use in a tire tread comprising (a) a polyisoprene rubber or a polyisoprene rubber and a synthetic rubber, (b) a denatured nitrosoquinoline compound and (c) carbon black.

3 Claims, No Drawings

RUBBER COMPOSITION FOR USE IN A TIRE TREAD

FIELD OF THE INVENTION

This invention relates to a rubber composition for use in a tire tread in which wear resistance is improved without deteriorating improvement of rebound resilience, especially when tires are used on a paved road.

BACKGROUND OF THE INVENTION

The development of tires which result in low fuel consumption has been prompted due to demands directed to energy saving.

To achieve these properties, attempts have been made to improve rebound resilience of a rubber compound of a tire.

U.S. Pat. No. 3,842,034 discloses that a rubber composition containing a nitrosoquinoline compound, such as 5-nitroso-8-hydroxyquinoline, improves the rebound resilience of the composition. The nitrosoquinoline compound has the general formula:

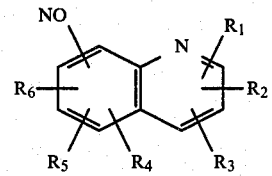

wherein $R_1$, $R_2$, $R_3$, $R_4$, $R_5$ and $R_6$ are each a hydrogen atom, a hydroxyl group, an alkyl group, an aralkyl group, a cycloalkyl group or an aminoalkyl group.

When the nitrosoquinoline is added to a rubber composition for the tire tread, the rubber composition provides an excellent improvement in rebound resilience, but the wear resistance of the tire decreases.

After detailed investigations as to the effects of rebound resilience and wear resistance of many rubber compositions for tires, which contain many kinds of nitrosoquinoline compounds and the like, it has been found that the addition of compounds having a nitroso group results in a deterioration of the wear resistance of tire treads.

SUMMARY OF THE INVENTION

Therefore, one object of this invention is to provide a rubber composition which provides good rebound resilience without the wear resistance being deteriorated.

The above-described object of this invention is attained with a rubber composition for use in tire treads, which comprises (a) 100 parts by weight of (i) a polyisoprene rubber selected from the group consisting of natural rubber and synthetic polyisoprene rubber, or (ii) the polyisoprene rubber and a synthetic rubber selected from the group consisting of styrene-butadiene rubber (5 to 45 wt% of styrene and 55 to 75 wt% of butadiene), butadiene rubber, isobutylene-isoprene rubber (e.g., 99 to 96 wt% of isobutadiene and 1 to 4 wt% of isoprene) and halogenated (brominated or chlorinated) isobutadiene-isoprene rubber, (b) about 0.5 to about 5.0 parts by weight, based on weight converted to the equivalent weight of 5-nitroso-8-hydroxyquinoline, of a denatured nitrosoquinoline compound selected from the group consisting of an isocyanated nitrosoquinoline compound and an acylated nitrosoquinoline compound, and (c) about 30 to about 90 parts by weight of carbon black having a nitrogen adsorption value ($N_2SA$) of about 65 to about 170 $m^2/g$ and a dibutylphthalate (DBP) adsorption value of about 80 to about 125 ml/100 g.

A preferred embodiment of this invention is the use, as the denatured nitrosoquinoline compound, of a compound represented by the following general formula (I):

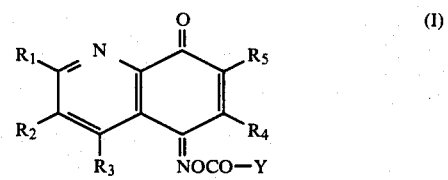

wherein $R_1$, $R_2$, $R_3$, $R_4$ and $R_5$ are each a hydrogen atom, a halogen atom, an amino group, an alkyl group, an alkoxy group or —$CH_2X$, where X is an amino group, a morpholino group, a hydroquinolino group or an aryl group, and Y is an alkyl group, an aryl group, a cycloalkyl group or —$NHR_6$, where $R_6$ is an alkyl group, an aryl group or a cycloalkyl group.

DETAILED DESCRIPTION OF THE INVENTION

In the rubber composition according to the invention, the polyisoprene rubber or a blend of the polyisoprene rubber and the synthetic rubber is used in an amount of 100 parts by weight.

It is preferred for the polyisoprene rubber to be used in an amount of at least about 40 parts by weight based on 100 parts by weight of the blend of the polyisoprene rubber and the synthetic rubber in order to achieve better rebound resilience.

Many denatured nitrosoquinoline compounds are obtained by reacting different nitrosoqinoline compounds with organic isocyanates or acylation agents.

It is preferred to use, as the starting material for the denatured nitrosoquinoline compound,
5-nitroso-8-hydroxyquinoline (E),
5-nitroso-7-dibutylaminomethylene-8-hydroxyquinoline (F),
5-nitroso-7-morpholinomethylene-8-hydroxyquinoline (G),
7-nitroso-8-hydroxy-5-methylquinoline,
5-nitroso-8-hydroxy-6-methylquinoline,
8-nitroso-5-hydroxy-6-methylquinoline,
5-nitroso-8-hydroxy-7-methylquinoline,
5-nitroso-6-hyroxyquinoline,
5-nitroso-2,8-dihydroxyquinoline,
8-nitroso-5-hydroxy-6-hexylquinoline,
5-nitroso-7-(2-hydroxy-3,5-dimethylbenzyl)-8-hydroxyquinoline,
5-nitroso-7-(7-methylene-8-hydroxyquinolyl)-8-hydroxyquinoline,
5-nitroso-7-(dibutylaminomethylene)-8-hydroxyquinoline,
5-nitroso-7-(4-morpholylmethylene)-8-hydroxyquinoline
or
6-nitroso-5-hydroxy-8-methylquinoline,
and it is especially preferred to use
5-nitroso-8-hydroxyquinoline, 5-nitroso-7-dibutylaminomethylene-8-hydroxyquinoline,
or
5-nitroso-7-morpholinomethylene-8-hydroxyquinoline as the denatured nitrosoquinoline compound.

Examples of organic isocyanates which can be employed are aromatic isocyanates such as
4,4'-diisocyanate-diphenylmethane,
1,5-naphthalene-diisocyanate,
p-chlorophenyl-isocyanate,
1-chloro-2,4-phenylene-diisocyanate,
xylene-diisocyanate,
tolylene-diisocyanate,
phenyl-isocyanate,
3,4-dichlorophenyl-isocyanate,
m-phenylene diisocyanate,
tolidine-diisocyanate,
1,4-phenylene-diisocyanate,
3,3'-dimethyl-4,4'-diphenylmethane-diisocyanate,
4,4'-diphenylpropane-[2,2]-diisocyanate,
3,3'-dimethyl-4,4'-bisphenyl-diisocyanate,
3,3'-dimethoxy-4,4'-diphenyl-diisocyanate,
4,4'-diphenyl-diisocyanate,
dianisidine-diisocyanate,
o-chlorophenyl-isocyanate,
m-chlorophenyl-isocyanate,
2,5-dichlorophenyl-isocyanate,
triphenylmethane-triisocyanate
and
2,6-diisocyanate-methylcaproate, aliphatic isocyanates such as
hexamethylene-diisocyanate,
octadecyl isocyanate,
n-butyl-isocyanate,
propyl-isocyanate,
isopropyl-isocyanate,
ethyl-isocyanate,
methyl-isocyanate
and
trans-vinylene-diisocyanate, cycloalkyl isocyanates such as
methylcyclohexylene-diisocyanate,
isopropylidene-bis-(4-cyclohexylisocyanate)-isophorone-diisocyanate,
cyclohexyl-isocyanate
and
4,4'-dicyclohexylmethane-diisocyanate, polyisocyanates such as
polymeric-diphenylmethane-diisocyanate,
N,N'-(4,4'-dimethyl-3,3'-diphenyldiisocyanate)-uredione (the dimer of TDI)
and
4,4',4''-trimethyl-3,3',3''-triisocyanate-2,4,6-triphenylisocyanurate (the trimer of TDI),
and other compounds which decompose and produce the above-mentioned isocyanates. Of these examples, it is preferred to use aromatic isocyanates such as
4,4'-diisocyanate-diphenylmethane,
1,5-naphthalene-diisocyanate,
p-chlorophenyl-isocyanate
and
1-chloro-2,4-phenylene-diisocyanate.

Suitable acylation agents which can be used include monocarboxylic acids, polycarboxylic acids and the acid anhydrides and the acid halides thereof, which are saturated aliphatic, unsaturated aliphatic, cycloalkyl, aromatic and heterocyclic acids.

Examples of suitable monocarboxylic acids are formic acid, acetic acid, propanoic acid, butanoic acid, 2-methylpropanoic acid, pentanoic acid, 3-methylbutanoic acid, 2-methylbutanoic acid, 2,2-dimethylpropanoic acid, caproic acid, heptoic acid, caprylic acid, pelargonic acid, capric acid, undecylic acid, lauric acid, myristic acid, palmitic acid, margaric acid, stearic acid, oleic acid, acrylic acid, crotonic acid, linolic acid, linolenic acid, naphthenic acid, and benzoic acid.

Examples of suitable polycarboxylic acids are ethanedioic acid, propanedioic acid, succinic acid, glutaric acid, adipic acid, pimelic acid, suberic acid, azelaic acid, sebacic acid, maleic acid, fumaric acid, itaconic acid, phthalic acid, isophthalic acid, terephthalic acid and pyromellitic acid.

Examples of suitable acid anhydrides are acetic anhydride, propionic anhydride, n-butyric anhydride, succinic anhydride, glutaric anhydride, isobutyric anhydride, n-valeric anhydride, n-caproic anhydride, maleic anhydride, itaconic anhydride and phthalic anhydride.

Examples of appropriate acid halides are oxalyl chloride, succinyl chloride, benzoyl chloride, acetyl chloride, isobutyryl chloride and propionyl chloride.

Of these examples of acylation agents, it is preferred to use naphthenic acid, acetic acid, lauric acid, benzoic acid, acetic anhydride, phthalic anhydride, maleic anhydride, benzoyl chloride and acetyl chloride.

Preferably, the nitrosoquinoline is reacted with an organic isocyanate in an organic solvent such as toluene and benzene under an inert atmosphere such as $N_2$ at a temperature between about 20° and about 110° C., preferably at a temperature between 50° and 100° C.

It is preferred to react the nitrosoquinoline with an acylation agent in a hydrophilic solvent such as acetone, methanol, ethanol or water under an inert atmosphere such as $N_2$ at a temperature between about 0° and about 40° C.

The denatured nitrosoquinoline compounds of this invention are not to be construed as being limited to those produced under the reaction conditions given above.

Examples of denatured nitrosoquinoline compounds which can be used in this invention are set forth below.

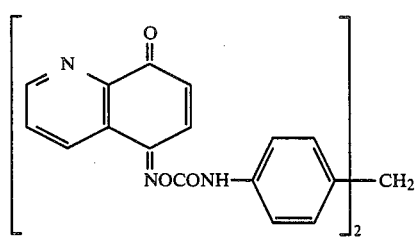

[A]

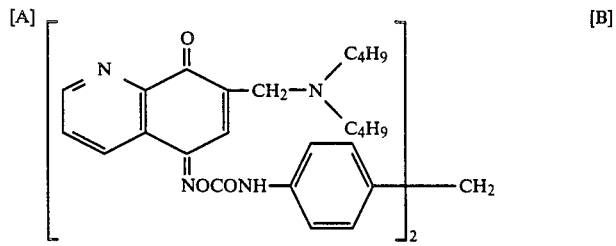

[B]

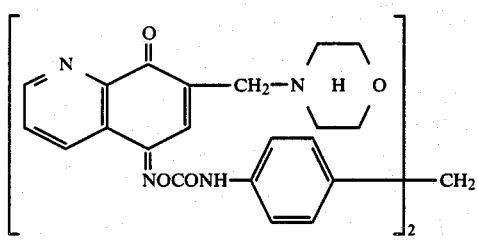 [C]
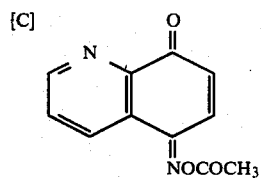 [D]
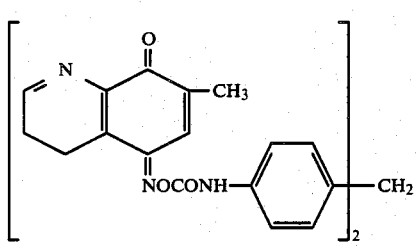 [E]
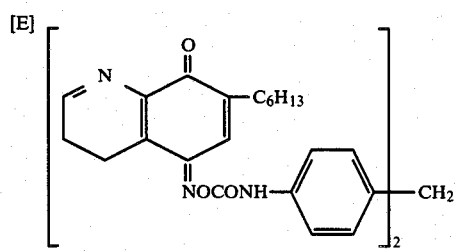 [F]
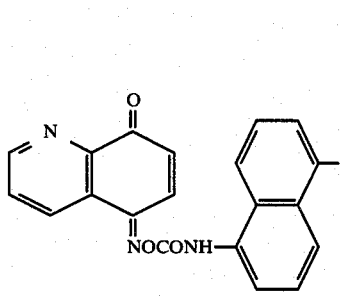 [G]
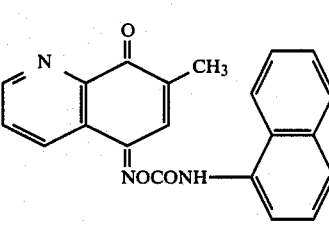 [H]
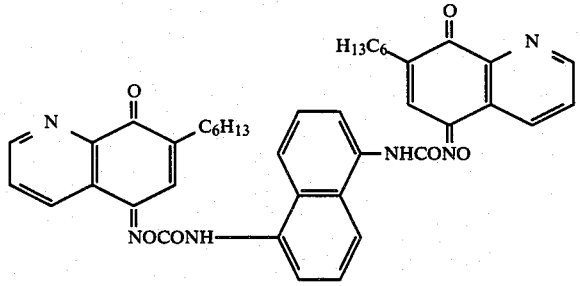 [I]
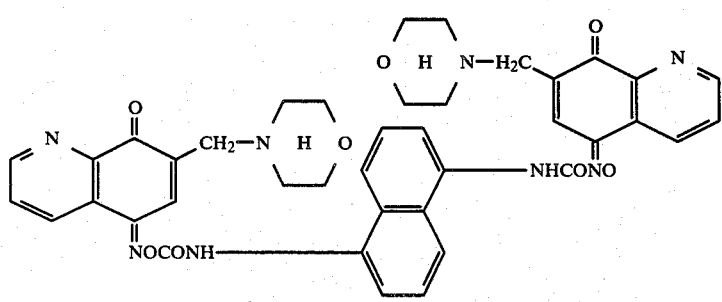 [J]

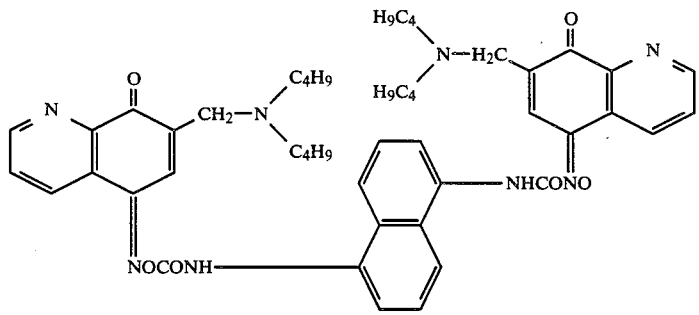
[K]
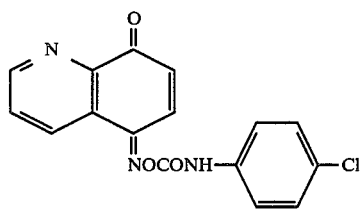 [L]
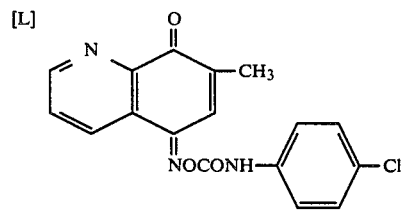 [M]
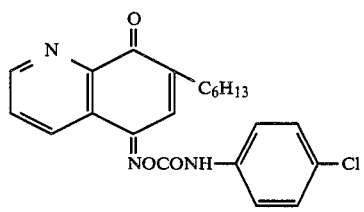 [N]
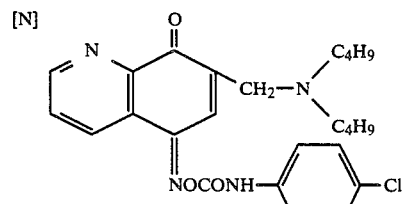 [O]
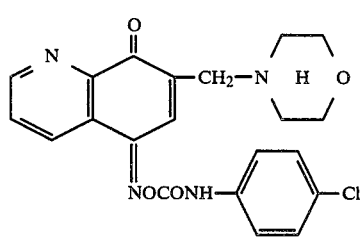 [P]
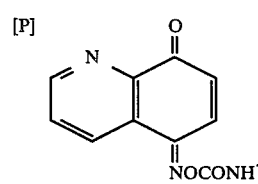
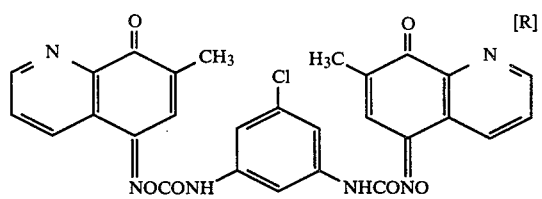 [Q]
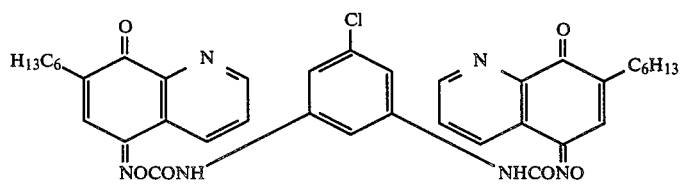 [R]
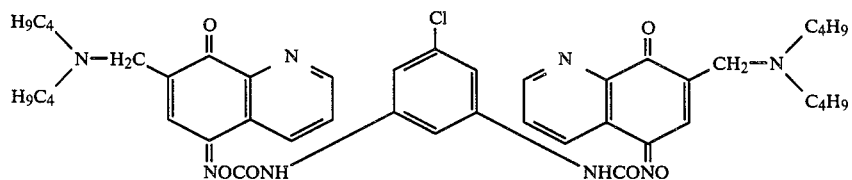 [S]
[T]

-continued
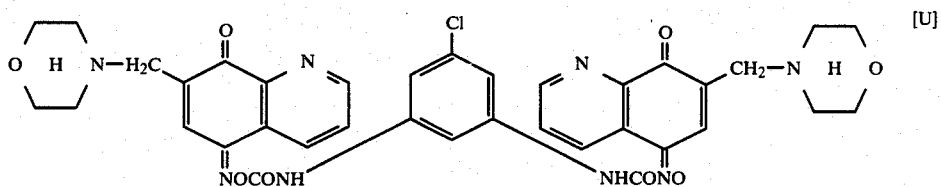
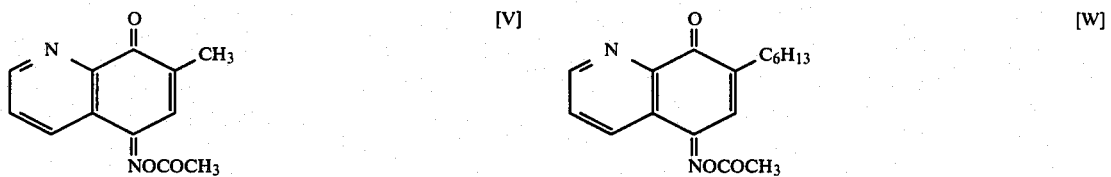
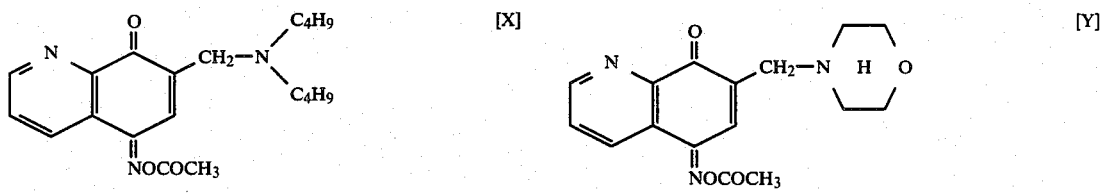
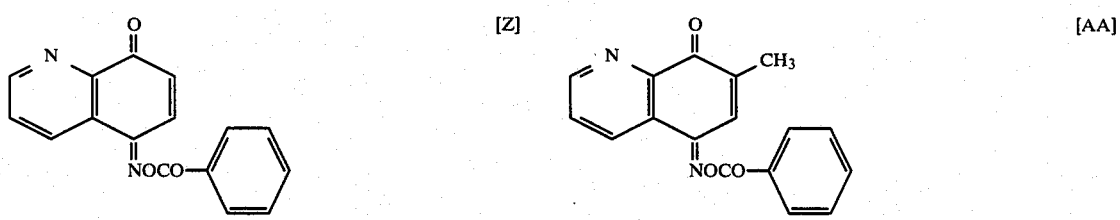
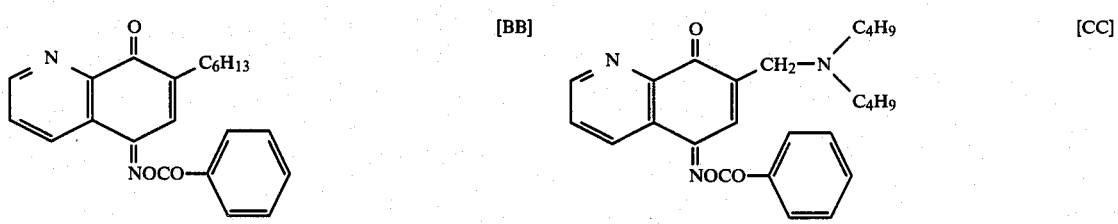
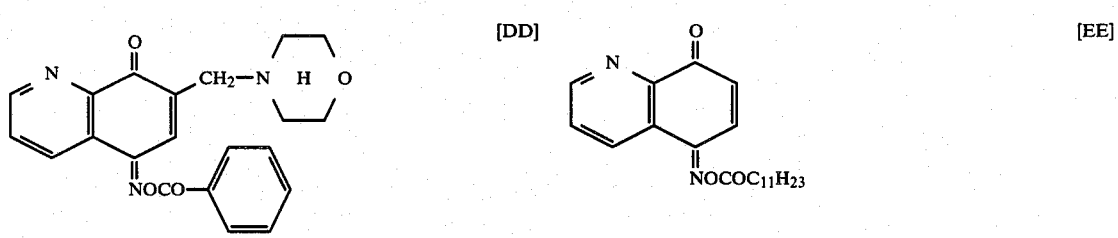
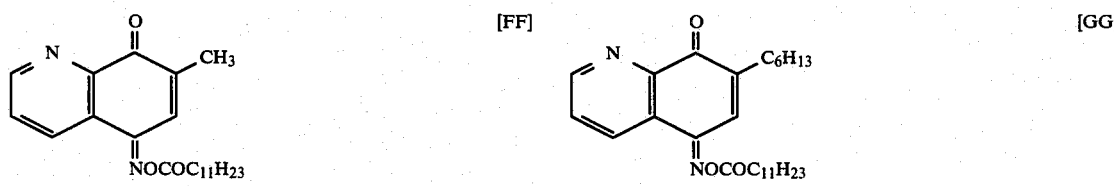
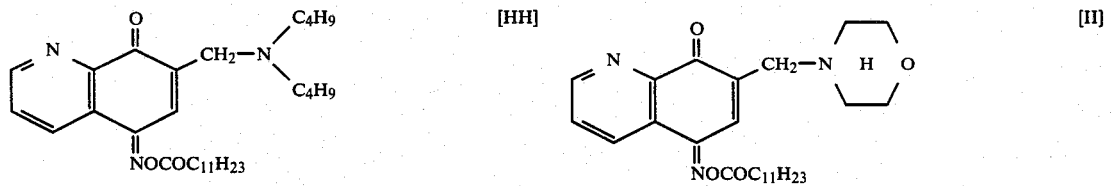

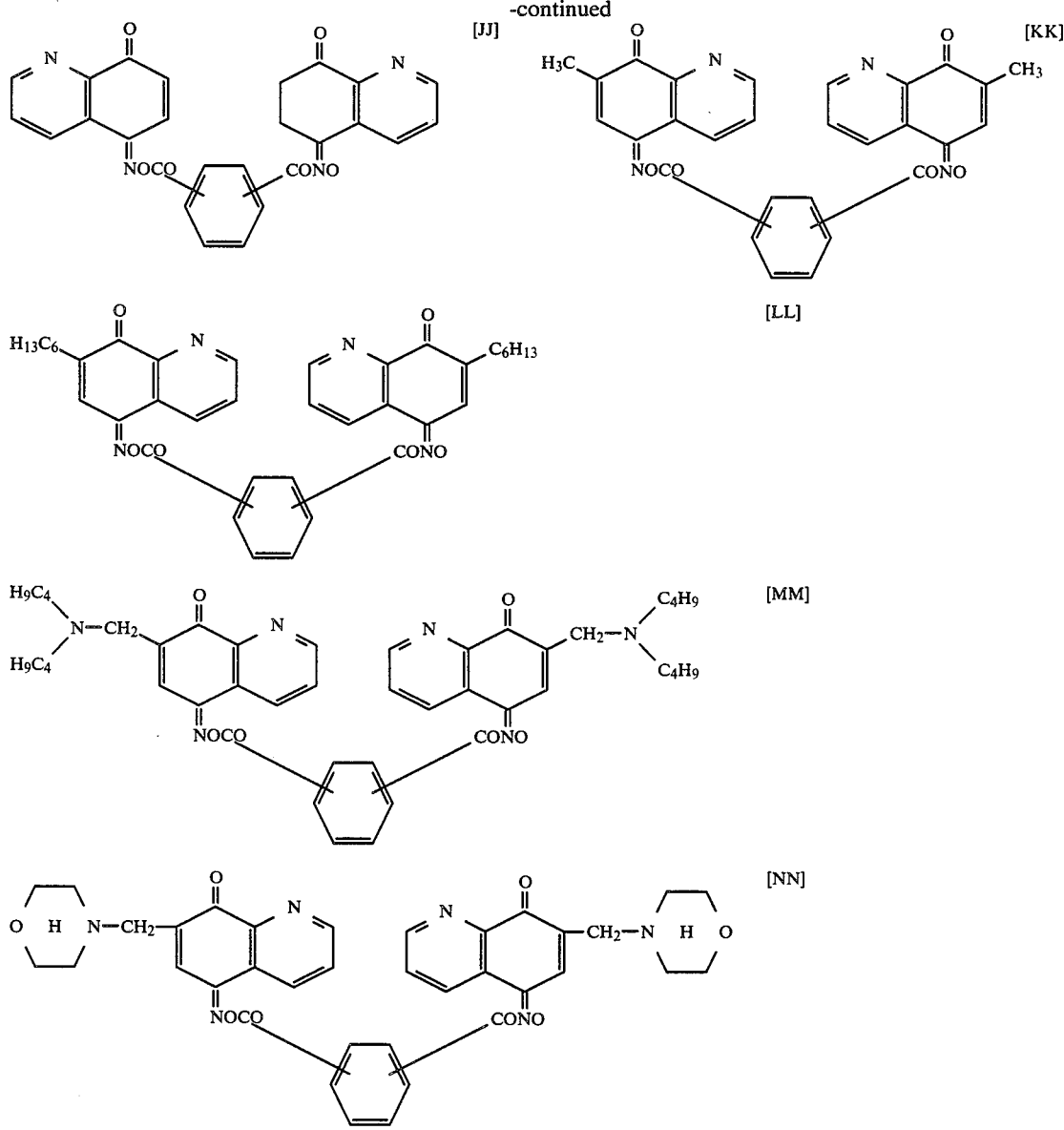

When the denatured nitrosoquinoline compound is used in an amount of less than about 0.5 parts by weight, based on weight converted to the equivalent weight of 5-nitroso-8-hydroxyquinoline, the rubber composition obtained does not provide any substantial improvements in rebound resilience and wear resistance.

When the denatured nitrosoquinoline compound is used in an amount of more than about 5 parts by weight, based on weight converted to the equivalent weight of 5-nitroso-8-hydroxyquinoline, the hardness of the unvulcanized rubber composition obtained increases and this results in bad workability thereof and bad dispersion of ingredients, which causes bad mechanical properties, while the vulcanized rubber composition obtained achieves very little improvement in rebound resilience.

The carbon black which is used in the rubber composition of this invention needs to have a nitrogen adsorption value ($N_2SA$) of about 65 to about 170 $m^2/g$ and a dibutyl phthalate (DBP) absorption value of about 80 to about 125 ml/100 g. When the $N_2SA$ is less than about 65 $m^2/g$ or the DBP is less than about 80 ml/100 g, the resulting rubber composition does not provide sufficient reinforcement, which means insufficient wear resistance and cut resistance for use in tire treads. When the $N_2SA$ exceeds about 170 $m^2/g$ or the DBP exceeds about 125 ml/100 g, the dispersion of the carbon black is decreased and the rebound resilience of the resulting rubber composition is deteriorated.

The amount of carbon black which can be used is about 30 to about 90 parts by weight because the rubber composition does not have sufficient wear resistance and cut resistance for use in tire treads when the amount of carbon black is less than about 30 parts by weight and because not only is the dispersion of carbon black greatly reduced but also the tensile strength and the rebound resilience of the resulting rubber composition are deteriorated when the amount of carbon black is more than about 90 parts by weight.

In the present invention, the nitrogen adsorption value ($N_2SA$) is measured according to ASTM D-3037, and the DBP absorption value is measured according to JIS K-6221.

The present invention will be illustrated in greater detail with reference to the following examples, which are not, however, to be interpreted as limiting the invention thereto. Unless otherwise indicated herein, all parts, percents, ratios and the like are by weight.

PREPARATION EXAMPLE 1

Synthesis of Compound [A]

A mixture of 25.0 g of 4,4'-diisocyanate diphenyl methane and 3.5 g of 5-nitroso-8-hydroxyquinoline was added to 200 ml of benzene in a reactor having a tube for bubbling nitrogen through the mixture. After replacing the atmosphere in the reactor with nitrogen, the reactor was transferred into an oil bath maintained at 110° C. The reaction was carried out with continuous bubbling of nitrogen through the mixture for 2 hours. The precipitate in the reactor was washed sufficiently with benzene and dried under vacuum. The yield of the reaction product was 80%. The reaction product was identified as Compound [A], indicated above, by elemental analysis.

PREPARATION EXAMPLE 2

Synthesis of Compound [B]

Compound [B], indicated above, was prepared using the same procedures as in Preparation Example 1, except that 3.5 g of 5-nitroso-8-hydroxyquinoline was changed to 6.3 g of 5-nitroso-7-(dibutyl-aminomethylene)-8-hydroxyquinoline.

PREPARATION EXAMPLE 3

Synthesis of Compound [C]

Compound [C], indicated above, was prepared using the same procedures as in Preparation Example 1, except that 3.5 g of 5-nitroso-8-hydroxyquinoline was changed to 5.5 g of 5-nitroso-7-morpholylmethylene-8-hydroxyquinoline.

PREPARATION EXAMPLE 4

Synthesis of Compound [D]

After 17.4 g of 5-nitroso-8-hydroxyquinoline was dissolved in 500 ml of methanol, 50 g of anhydrous sodium carbonate was added to the resulting solution. Then, 10.1 g of acetic anhydride was added to the mixture with stirring. After reaction for 10 hours, the precipitate formed was filtered and washed with 1,000 ml of methanol. Then, the precipitate was poured into 1,000 ml of water. The yield of Compound [D], indicated above, was 75%.

EXAMPLES 1 TO 5, Comparative Examples 1 TO 5

Ten different rubber compositions were prepared by kneading the components in the compounding ratios shown in Table 1 below using a Banburg mixer. The characteristics of each of the compositions are also shown in Table 1 below.

Note, the amounts in Table 1 below and also in Table 2 below are in parts by weight unless otherwise indicated.

TABLE 1

| Components | Example No. 1 | 2 | 3 | 4 | 5 | Comparative Example No. 1 | 2 | 3 | 4 | 5 |
|---|---|---|---|---|---|---|---|---|---|---|
| Natural Rubber | 100 | 100 | 100 | 50 | 70 | 100 | 50 | 50 | 70 | 70 |
| SBR 1500 | — | — | — | 50 | 20 | — | 50 | 50 | 20 | 20 |
| BR 01 | — | — | — | — | 10 | — | — | — | 10 | 10 |
| Carbon Black ISAF | 50 | 50 | 50 | 50 | — | 50 | 50 | 50 | — | — |
| Carbon Black SAF | — | — | — | — | 45 | — | — | — | 45 | 45 |
| Stearic Acid | 2 | 2 | 2 | 2 | 2 | 2 | 2 | 2 | 2 | 2 |
| N—1,3-Dimethylbutyl-N'—phenyl p-phenylenediamine | 1 | 1 | 1 | 1 | 1 | 1 | 1 | 1 | 1 | 1 |
| Zinc Oxide | 4 | 4 | 4 | 4 | 4 | 4 | 4 | 4 | 4 | 4 |
| Sulfur | 1.5 | 1.5 | 1.5 | 1.8 | 1.5 | 1.5 | 1.8 | 1.8 | 1.5 | 1.5 |
| N—Oxydiethylene-2-benzothiazole sulfenamide | 1.0 | 1.0 | 1.0 | — | 1.0 | 1.0 | — | — | 1.0 | 1.0 |
| N—Cyclohexyl-2-benzothiazyl sulfenamide | — | — | — | 0.7 | — | — | 0.7 | 0.7 | — | — |
| Diphenylguanidine | — | — | — | 0.8 | — | — | 0.8 | 0.8 | — | — |
| Denatured Nitrosoquinoline Compound [A] | 1.3 (0.5) | 3.3 (2.0) | 6.5 (5.0) | 8.8 (2.0) | 8.8 (2.0) | — | — | — | — | — |
| 5-nitroso-8-hydroquinoline | — | — | — | — | — | — | — | 2.0 | — | 2.0 |
| Resilience | 63 | 65 | 67 | 55 | 62 | 57 | 49 | 58 | 58 | 62 |
| tan δ | 0.105 | 0.090 | 0.083 | 0.185 | 0.139 | 0.121 | 0.210 | 0.183 | 0.161 | 0.138 |
| TB (Kg/cm$^2$) | 278 | 283 | 276 | 269 | 303 | 279 | 271 | 256 | 301 | 282 |
| 200% Modulus (Kg/cm$^2$) | 99.1 | 101 | 103 | 71.9 | 83.7 | 97.5 | 72.4 | 63.7 | 83.4 | 79.1 |
| Wear Resistance | 101 | 102 | 100 | 101 | 99.7 | 100 | 101 | 87.3 | 98.7 | 86.5 |

In Tables 1 and 2, the numerals in parentheses denote parts by weight, based on weight converted to the equivalent weight of 5-nitroso-8-hydroxyquinoline, of the denatured nitrosoquinoline compound. Accordingly, when a denatured nitrosoquinoline compound has n hydroquinoline rings in the molecule, the numeral in parentheses denotes n times the weight of the same number of moles of 5-nitroso-8-hydroxyquinoline.

The resilience was evaluated with a Lüpke pendulum tester according to the JIS K-6301. The larger the value, the better the rebound resilience.

Tan δ was measured under the conditions of a dynamic shear strain amplitude of 1.0% and a frequency of 1.0 Hz at 30° C. using a mechanical spectrometer manufactured by Rheometrics, Inc. A smaller value shows a better rebound resilience.

Wear resistance was evaluated as follows: Six different tires were prepared. Each tire had two rubber compositions in the tread portion thereof. One is the rubber composition of Comparative Example 1. The other is a rubber composition selected from those of Examples 1 to 8 and Comparative Examples 2 to 9 shown in Tables 1 and 2. The tires were run for 50,000 km on paved roads and the depths of the tread grooves remaining were measured. Wear resistance was representd as an index using the rubber composition of Comparative Example 1 as a control.

The higher the index value, the better the wear resistance.

In Table 1, rubber compositions containing the denatured nitrosoquinoline [A] are compared with rubber compositions containing 5-nitroso-8-hydroquinoline or the rubber compositions without either. When the rubber component is natural rubber, Example 2 is compared with Comparative Example 1. When the rubber components are natural rubber and styrene-butadiene rubber, Example 4 is compared with Comparative Examples 2 and 3. When the rubber components are natural rubber, styrene-butadiene rubber and butadiene rubber, Example 5 is compared with Comparative Examples 4 and 5.

These results obtained show that rebound resilience and wear resistance are far more advantageously present together in the rubber compositions of the Examples in comparison with the rubber compositions of the Comparative Examples. The results of Examples 1 to 3 show that denatured nitrosoquinoline Compound [A] is effective in an amount between 0.5 an 5 parts by weight based on weight converted to the equivalent weight of 5-nitroso-8-hydroxyquinoline.

EXAMPLES 6 TO 8, COMPARATIVE EXAMPLES 6 TO 9

Seven different rubber compositions were prepared and evaluated in the same manner as for the rubber composition in Table 1. The results obtained are shown in Table 2 below.

TABLE 2

| Components | Example No. | | | Comparative Example No. | | | |
| --- | --- | --- | --- | --- | --- | --- | --- |
| | 6 | 7 | 8 | 6 | 7 | 8 | 9 |
| Natural Rubber | 100 | 100 | 100 | 100 | 100 | 100 | 100 |
| Carbon Black ISAF | 50 | 50 | 50 | 50 | 50 | 50 | 50 |
| Stearic Acid | 2 | 2 | 2 | 2 | 2 | 2 | 2 |
| N—1,3-Dimethylbutyl-N'—phenyl p-phenylenediamine | 1 | 1 | 1 | 1 | 1 | 1 | 1 |
| Zinc Oxide | 4 | 4 | 4 | 4 | 4 | 4 | 4 |
| Sulfur | 1.5 | 1.5 | 1.5 | 1.5 | 1.5 | 1.5 | 1.5 |
| N—Oxydiethylene-2-benzothiazole sulfenamide | 1.0 | 1.0 | 1.0 | 1.0 | 1.0 | 1.0 | 1.0 |
| Denatured Nitrosoquinoline Compound [B] | 4.9 (2.0) | — | — | — | — | — | — |
| Denatured Nitrosoquinoline Compound [C] | — | 4.3 (2.0) | — | — | — | — | — |
| Denatured Nitrosoquinoline Compound [D] | — | — | 2.5 (2.0) | — | — | — | — |
| 5-Nitroso-8-hydroxyquinoline | — | — | — | 2.0 | — | — | — |
| 5-Nitroso-7-(dibutyl-aminomethylene)-8-hydroxyquinoline | — | — | — | — | 3.6 (2.0) | — | — |
| 5-Nitroso-7-morpholylmethylene-8-hydroxyquinoline | — | — | — | — | — | 3.0 (2.0) | — |
| 8-hydroxyquinoline | — | — | — | — | — | — | 1.6 (2.0) |
| Resilience | 72 | 71 | 64 | 64 | 72 | 71 | 61 |
| tan δ | 0.066 | 0.078 | 0.092 | 0.091 | 0.067 | 0.080 | 0.126 |
| TB (Kg/cm$^2$) | 284 | 281 | 285 | 268 | 258 | 269 | 278 |
| 200% Modulus (Kg/cm$^2$) | 98.0 | 95.7 | 96.3 | 90.2 | 85.4 | 88.3 | 99.6 |
| Wear Resistance | 101 | 101 | 100 | 88.8 | 85.7 | 86.2 | 99.1 |

From the results in Table 2, when the rubber component is natural rubber, the rubber composition containing the denatured (isocyanated) nitrosoquinoline compound [B] or [C] is compared with the rubber composition containing 5nitroso-8-hydroquinoline or 5-nitroso-7-(dibutyl-aminomethylene)-8-hydroxyquinoline, respectively (Example 6 vs. Comparative Example 7; Example 7 vs. Comparative Example 8). The rubber composition containing the denatured (acylated) nitrosoquinoline compound [D] is compared with the rubber composition containing 5-nitroso-8-hydroxyquinoline (Example 8 vs. Comparative Example 6).

The results in Table 2 above show that the rubber compositions of this invention have a great advantage from the standpoint of rebound resilience with wear resistance.

The result for Comparative Example 9 shows, for reference, that 8-hydroxyquinoline, which does not contain a nitroso group, is not effective to achieve good rebound resilience.

The results hereinabove described demonstrate that the rubber compositions of this invention advantageously enable both rebound resilience and wear resistance to be obtained.

While the invention has been described in detail and with reference to specific embodiments thereof, it will be apparent to one skilled in the art that various changes and modifications can be made therein without departing from the spirit and scope thereof.

I claim:

1. A rubber composition for use in a tire tread comprising:
    (a) 100 parts by weight of a polyisoprene rubber selected from the group consisting of natural rubber and synthetic polyisoprene rubber,
    (b) about 0.5 to about 5.0 parts by weight, based on weight converted to the equivalent weight of 5-nitroso-8-hydroxyquinoline, of a denatured nitrosoquinoline compound selected from the group consisting of compounds represented by the following general formula (I):

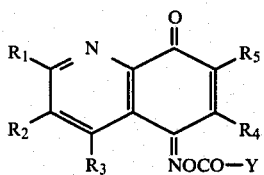

wherein $R_1$, $R_2$, $R_3$, $R_4$ and $R_5$ are each a hydrogen atom, a halogen atom, an amino group, an alkyl group, an alkoxy group or —$CH_2X$, where X is an amino group, a morpholino group, a hydroquinolino group or an aryl group, and Y is an alkyl group, an aryl group, a cycloalkyl group or —$NHR_6$, where $R_6$ is an alkyl group, an aryl group or a cycloalkyl group, and (c) about 30 to about 90 parts by weight of carbon black having a nitrogen adsorption value ($N_2SA$) of about 65 to about 170 $m^2/g$ and a dibutyl phthalate (DBP) adsorption value of about 80 to about 125 ml/100 g.

2. A rubber composition for use in a tire tread comprising:

(a) 100 parts by weight of a polyisoprene rubber selected from the group consisting of natural rubber and synthetic polyisoprene rubber and a synthetic rubber selected from the group consisting of styrene-butadiene rubber, butadiene rubber, isobutylene-isoprene rubber and halogenated isobutylene-isoprene rubber, (b) about 0.5 to about 5.0 parts by weight, based on weight converted to the equivalent weight of 5-nitroso-8-hydroxyquinoline, of a denatured nitrosoquinoline compound selected from the group consisting of compounds represented by the following general formula (I):

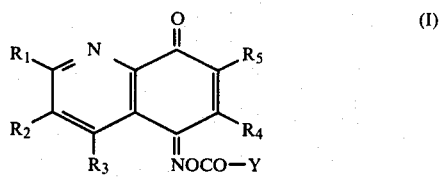

wherein $R_1$, $R_2$, $R_3$, $R_4$ and $R_5$ are each a hydrogen atom, a halogen atom, an amino group, an alkyl group, an alkoxy group of —$CH_2X$, where X is an amino group, a morpholino group, a hydroquinolino group or an aryl group, and Y is an alkyl group, an aryl group, a cycloalkyl group or —$NHR_6$, where $R_6$ is an alkyl group, an aryl group or a cycloalkyl group, and (c) about 30 to about 90 parts by weight of carbon black having a nitrogen adsorption value ($N_2SA$) of about 65 to about 170 $m^2/g$ and dibutyl phthalate (DBP) absorption value of about 80 to about 125 ml/100 g.

3. A rubber composition as claimed in claim 2, wherein said polyisoprene rubber selected from the group consisting of natural rubber and synthetic polyisoprene rubber is present in an amount of at least about 40 parts by weight.

* * * * *